US012398955B2

(12) United States Patent
English et al.

(10) Patent No.: US 12,398,955 B2
(45) Date of Patent: Aug. 26, 2025

(54) HIGH PRESSURE FURNACE AND METHODS OF USE

(71) Applicant: The Florida State University Research Foundation, Inc., Tallahassee, FL (US)

(72) Inventors: Charles Lamar English, Tallahassee, FL (US); George Miller, Tallahassee, FL (US); Ernesto Bosque, Tallahassee, FL (US)

(73) Assignee: THE FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 384 days.

(21) Appl. No.: 17/934,745

(22) Filed: Sep. 23, 2022

(65) Prior Publication Data

US 2023/0105323 A1 Apr. 6, 2023

Related U.S. Application Data

(60) Provisional application No. 63/249,903, filed on Sep. 29, 2021.

(51) Int. Cl.
*F27D 1/00* (2006.01)
*F27B 17/00* (2006.01)
(Continued)

(52) U.S. Cl.
CPC ............ *F27B 17/0083* (2013.01); *F27D 1/00* (2013.01); *F27D 7/06* (2013.01); *F27D 99/0006* (2013.01);
(Continued)

(58) Field of Classification Search
CPC .......... F24C 7/06; F24C 15/34; F27D 1/0036; F27D 7/06; F27D 1/00; F27D 2001/0059;
(Continued)

(56) References Cited

U.S. PATENT DOCUMENTS 1,056,933 A * 3/1913 Perkins ..................... F24C 7/06 219/407
3,865,554 A * 2/1975 Wenckus ................ C30B 15/30 422/119

(Continued)

FOREIGN PATENT DOCUMENTS

GB 1537563 A * 12/1978 ........... B30B 11/002
JP 2000186889 A 4/2000

(Continued)

OTHER PUBLICATIONS

International Search Report and Written Opinion, PCT/US2022/044520, mailed Dec. 19, 2022 (14 pp.).

*Primary Examiner* — Gregory A Wilson
(74) *Attorney, Agent, or Firm* — Eversheds Sutherland (US) LLP

(57) ABSTRACT

A furnace system including an outer shell which comprises a top flange, an elongated body portion, and a bottom flange, wherein the outer shell is a pressure vessel, with no penetrations in the elongated body portion; a heater assembly which comprises (i) a single-piece annular shaped insulation layer, and (ii) a plurality of heaters embedded in the insulation layer, wherein the heater assembly is disposed within the elongated body portion of the outer shell; and an innermost layer disposed within the annular-shaped insulation layer, wherein the innermost layer is a baffle tube configured to force a natural convective flow, wherein each of the plurality of heaters is individually controllable and the plurality of heaters are configured to heat different zones within the furnace to different temperatures and/or at dif- (Continued)

ferent rates. The system may be used to heat treat magnet materials, such as those formed of Bi-2212, therein.

17 Claims, 11 Drawing Sheets

(51) Int. Cl.

| | |
|---|---|
| ***F27D 7/06*** | (2006.01) |
| ***F27D 99/00*** | (2010.01) |
| ***H01F 6/00*** | (2006.01) |
| *F27D 19/00* | (2006.01) |

(52) U.S. Cl.
CPC ......... *H01F 6/00* (2013.01); *F27D 2007/063* (2013.01); *F27D 2019/0009* (2013.01); *F27D 2019/0018* (2013.01)

(58) Field of Classification Search
CPC .... H05B 3/64; H05B 3/66; H05B 3/48; F27B 1/005; F27B 1/08; F27B 1/12; F27B 5/04
See application file for complete search history.

(56) References Cited

U.S. PATENT DOCUMENTS 4,849,608 A * 7/1989 Muraoka ............... F27D 1/0033 219/390
5,128,515 A 7/1992 Tanaka
2015/0053329 A1 2/2015 Kobayashi

FOREIGN PATENT DOCUMENTS

JP 3228530 U 10/2020
WO WO-2013006875 A1 * 1/2013 ........... C04B 20/066
WO 2021/174218 A1 9/2021

* cited by examiner

HIGH PRESSURE FURNACE AND METHODS OF USE

CROSS-REFERENCE TO RELATED APPLICATIONS

This application claims priority to U.S. Provisional Patent Application No. 63/249,903, filed Sep. 29, 2021, which is incorporated herein by reference.

STATEMENT REGARDING FEDERALLY SPONSORED RESEARCH AND DEVELOPMENT

This invention was made with government support under contract DE-SC00010421 awarded by the DOE. The government has certain rights in the invention.

BACKGROUND

Production of many types of superconductor materials and magnets require specialized high-temperature, high-pressure furnaces. In many applications, the reliability of the furnace is a top priority, as gas or temperature leaks may compromise the environment required for superconductor material production. High-pressure, high-temperature furnaces frequently have leaks or failures that prevent the furnace from reaching the required conditions efficiently. If the leaks or failures are severe, the furnace is unable to reach the required temperature or pressures at all. Temperature needs to be controlled precisely in these furnaces, which is difficult with conventional furnace designs due to leaks. The furnace still needs to have access points for gas flow and electrical feedthroughs, control thermocouples, and pressure transducers. Gas also needs to be fed at a controlled rate in a manner that properly flows throughout the furnace. Therefore, it is important to design a furnace that mitigates or eliminates undesirable leak paths associated with conventional furnace designs.

One previous attempt in 2013 to build an over pressure furnace reaching similar standards of temperature and pressure resulted in a furnace that leaked profusely from the main flange seals, port plugs, electrical and thermocouple feedthroughs, overpressure relief valve, gas manifold, back-pressure regulator, and the gas sample cabinet. The furnace had a back pressure regulator to control pressure, and thirty-six silicon carbide heating elements spread through 6 zones, and was intended to reach temperatures of 890° C. and 100 BAR (10 MPa). The internal insulation included four quarters on the sides with filler stuffed into the gaps, and a one-inch (approximately 2.5 cm) thick insulation on the ceiling. The furnace has twenty-four threaded ports in the body, thirteen in the base flange, and eight in the top flange. The base flange was welded to the frame, requiring the shell to be lifted up in order to install the item to process. The electrical connections for the three bottom zones required six wires from the upper shell as well as six wires sticking through the base flange. These wires had to be connected with ceramic nuts before fully lowering the shell. With this construction that included numerous unsecured entries, the weaker power supply and thirty-six heaters were insufficient to reach the necessary temperatures.

It therefore would be desirable to provide improved production furnaces.

BRIEF SUMMARY

In one aspect, a furnace system is provide that includes an outer shell which comprises a top flange, an elongated body portion, and a bottom flange; a heater assembly which includes (i) a single-piece annular shaped insulation layer, and (ii) a plurality of heaters embedded in the insulation layer, wherein the heater assembly is disposed within the elongated body portion of the outer shell; and an innermost layer disposed within the annular-shaped insulation layer. The outer shell may be a pressure vessel, with no penetrations in the elongated body portion. The innermost layer may be a baffle tube configured to force a natural convective flow.

In a particular embodiment, a furnace system is provided that includes an outer shell which comprises a top flange, an elongated body portion, and a bottom flange, wherein the outer shell is a pressure vessel, with no penetrations in the elongated body portion; a heater assembly which comprises (i) a single-piece annular shaped insulation layer, and (ii) a plurality of heaters embedded in the insulation layer, wherein the heater assembly is disposed within the elongated body portion of the outer shell; and an innermost layer disposed within the annular-shaped insulation layer, wherein the innermost layer is a baffle tube configured to force a natural convective flow, wherein each of the plurality of heaters is individually controllable and the plurality of heaters are configured to heat different zones within the furnace to different temperatures and/or at different rates.

In another aspect, the furnace system is used in a method to heat treat magnet materials, such those in a wire form and/or those formed of Bi-2212.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale.

DETAILED DESCRIPTION

Figure 1:
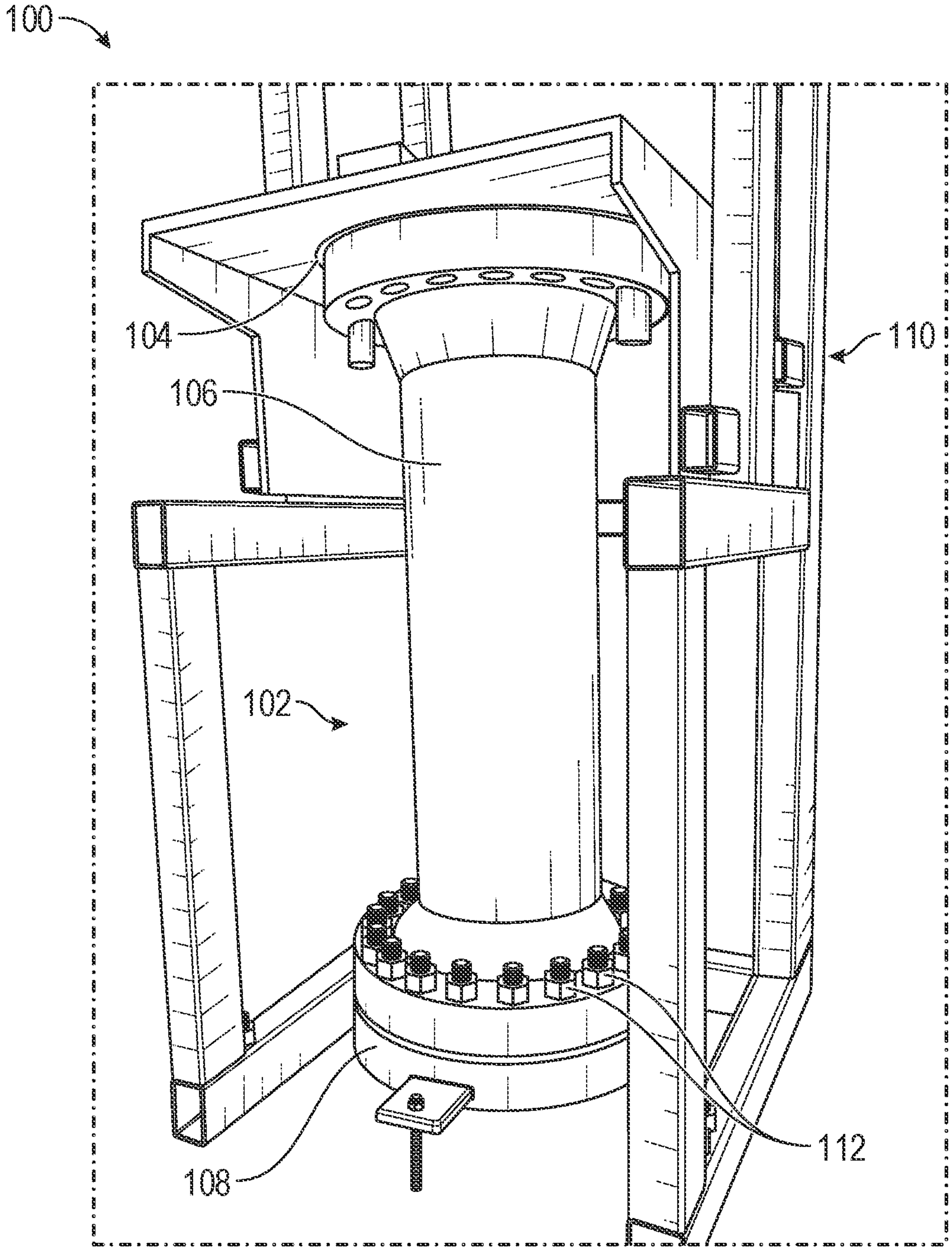
FIG. 1 illustrates a furnace in accordance with an embodiment of the disclosure.

This disclosure relates to improved furnace systems and methods for heat treating materials, such as Bi-2212 or other superconductor materials.

In embodiments, the furnace system includes an outer shell which comprises a top flange, an elongated body portion, and a bottom flange; a heater assembly which comprises (i) a single-piece annular shaped insulation layer, and (ii) a plurality of heaters embedded in the insulation layer, wherein the heater assembly is disposed within the elongated body portion of the outer shell; and an innermost layer disposed within the annular-shaped insulation layer, wherein the innermost layer defines a space in which materials/objects can be disposed for various heat treatments or reactions at high temperatures and pressures.

The furnace of the system advantageously includes an insulation structure with fewer and/or smaller gaps compared to conventional designs, thereby advantageously facilitating better management of the desired temperature and pressure conditions within the furnace, including the ability to reach higher temperatures and pressures than older, less efficient conventional furnaces. These systems and methods can thus be extended to other applications that utilize the high-pressure, high-temperature systems.

The present furnace systems and methods of use specifically may be useful in the production of certain types of magnets, superconductors, or superconducting materials. In some particular embodiments, the present furnace system enables the production of Bi-2212 round wire, other Bi-2212 superconductor, general science magnets, nuclear magnetic resonance magnets, high field magnetic resonance imaging magnets, accelerator type magnets, or superconducting high field magnets. However, the furnace systems and methods can also be applied in any other context and to any other type of device as well, especially those that require high-temperature systems, high-pressure systems, or systems with controlled gas flow.

The method involves operating the furnace in such a manner as to keep the temperature, pressure, and gas flow rate within suitable temperature and pressure conditions to make certain specialty material products. In some embodiments, the temperature and pressure are controlled by independently controlled heaters and carefully controlled flow of gas.

In particular embodiments, the furnace is a vertical well type with a cold wall design and is electrically powered. In some embodiments, the furnace includes an outer shell and a heating assembly inside the outer shell, where the heating assembly further comprises an insulation layer and a plurality of heaters. Inside the heating assembly is an innermost layer. The furnace further comprises a series of inlets and bores for the electrical feedthroughs, control thermocouples, pressure transducers, and gas inlets or outlets. In a preferred embodiment, the furnace must be capable of operating temperatures of at least 890° C. and pressures of at least 735 psi (5.07 MPa). The furnace generally includes various "zones" within the furnace that correspond to each heater.

In some embodiments, the outer shell is a stainless steel pressure vessel with a top flange, bottom flange, and body. The outer shell can also be various other suitable materials, such as an alloy of nickel, chromium, and iron (e.g., an Inconel® alloy, available commercially from Special Metals Corporation, New Hartford, New York, USA). The outer shell preferably is built to ASME Boiler and Pressure Vessel Code Rules, Section VIII, Division 1. The top flange and bottom flange are secured to the body by a number of securing means, such as bolts, in the flanges and the body. In some preferred embodiments, the body of the outer shell has no bores, feedthroughs, or inlets.

In some embodiments, the top flange is removable by a hydraulic ram and includes a number of inlets or bores for feedthroughs, thermocouples, pressure transducers, and gas inlets or outlets. The top flange specifically may include the sample thermocouples and gas outlet.

In some embodiments, the bottom flange remains bolted to the body during the loading and operation of the furnace and includes a number of inlets or bores for feedthroughs, thermocouples, pressure transducers, and gas inlets or outlets. The bottom flange specifically may include more inlets or bores than the top flange, and for example the bottom flange may include the electrical feedthroughs, control thermocouples, pressure transducers, and gas inlets.

In some embodiments, the heater assembly further includes six individually controlled heaters. The insulation layer may include or consist of a ceramic fiber shell with a one-piece body and heaters embedded into the shell. The ceramic shell further may include a separate bottom plate, or it may be a single monolithic structure. The heater assembly preferably is cast in one piece to prevent gaps in the insulation and ensure the heater elements are flush with the inner diameter. In some embodiments, the body of the heater assembly has no bores, feedthroughs, or inlets. The ceramic shell comprises electrical lead wires extending from the bottom, spaced 30 degrees apart around the bottom edge. These wires may be used to guide and secure the ceramic shell into proper alignment with the bottom flange or outer shell. The ceramic housing also operated as wall insulation. The ceramic layer has no penetrations in the body tube. The ceramic layer is cast in one piece to prevent gaps in the insulation.

In some embodiments, further insulation is added via 2-inch (50.8 mm) thick insulation plates made of ceramic fiberboard. In some embodiments, two such plates are added to the ceiling of the heater assembly and one such plate is added to the bottom. The two plates at the top may be secured by one or more suitable fasteners.

In some embodiments, the heaters are circular heaters and each heater corresponds to a certain zone. The heaters may be the same strength, or certain heaters may have more power than others.

In some embodiments, the innermost layer includes a baffle tube with a series of openings radially spaced around the circumference near the bottom to force a natural convective flow. The innermost layer may be a tube formed of an alloy of nickel, chromium, and iron (e.g., an Inconel®).

In some embodiments, an annular space is created between the heater assembly and innermost layer. This annular space allows for control thermocouples to be inserted from the bottom of the assembly, extending into the various zones. Gas entering a bottom inlet also flows through this annular space. The heaters in the heater assembly, embedded into the ceramic layer, face this annular space and heat the gas passing through it.

In some embodiments, the gas that the furnace operates with is a mix of 98% Argon and 2% oxygen. Typically, the system includes an argon gas feed and a separate argon/ oxygen gas feed. In this way, the argon is usually supplied by itself (for example during temperature ramp up) before adding the argon/oxygen to initiate the desired reaction. For example, pure argon may be used to flush the furnace for 20 to 30 minutes before switching to a 2% oxygen/98% argon mixture. Other suitable ratios for the desired reaction or other gas mixtures may be used.

In some embodiments, an H-bracket is mounted to the top flange in a manner to secure the insulation plates to the ceiling of the furnace. The H-bracket may serve as a universal mount for various types of magnets such as solenoids, CCT (canted cosine theta) and "Race Track" coils. Adjustable holders and hanging fixtures are releasably attachable to the H-bracket to hold materials/objects within the furnace during operation of the furnace. Preferably, the hanging fixture in the assembled position holds such objects/materials at a position within the furnace that is optimal for the intended heat treatment, or other reaction, process.

In some embodiments, the top flange of the furnace is removable to provide access to the inside of the furnace. The top flange may be vertically displaced off of the securing mechanisms, such as bolts, to provide this access. Due to the weight of the top flange, a hydraulic ram, counterweight, or other means may be used to lift the flange.

The system includes hardware and software that controls gas mixture and flow rates, temperature ramp rate both up and down, maximum temperature and duration, dwell times at various temperatures. In a preferred embodiment, the hardware is configured to precisely control the temperature to within 1.5° C., pressure to within 1.5 psi (10.3 kPa), and gas flow to be exactly 2% oxygen. The hardware may use a LabView® based control system and an operating software that renders it superior to IDEC type controllers. The LabView® control system has been found to provide smaller fluctuations in operating temperatures and pressures, as well as more uniform control of ramp rates of change in temperature, compared to conventional control systems with conventional furnaces. These features allow for a homogenous working zone of 1 meter or more and ensure reliability and repeatability.

The hardware inside of the furnace, such as the H-bracket, as well as surfaces of bores, inlets, and outlets preferably are plasma-coated to prevent oxidation from occurring during a furnace run.

In some embodiments, the control thermocouples are 0.125 inches (3.175 mm) in diameter.

In a preferred embodiment, the furnace system is sized and configured to be operated to produce superconductors, superconducting materials, or magnets.

In some embodiments, the materials to create the product that is desired to be produced are inserted into the furnace and set within the working zone. The materials may be in the form of untreated magnets, superconductors, superconducting materials, alloys, or other materials.

In some embodiments, the top flange is then re-secured to the top of the vessel to create a sealed container. Once the top flange is secured, the furnace is ready to be pressurized.

In some embodiments, the individually controlled heaters are heated to 890° C. The heaters are more powerful on the bottom in order to create the working zone. The heaters ramp-up, cool-down, and holding times are all controlled. Thermocouples are used to ensure each heater is heating up, cooling down, and holding at the proper temperatures and rates.

In some embodiments, gas is introduced through a gas inlet in the bottom flange into the annular space between the insulation layer and innermost layer. The gas rate is precisely controlled both in total flow rate and in concentration of the gases. The gas flow can be controlled at a desired rate to change the length of the working zone within the furnace. The gas flows through the annular space, past the heaters, and into the rest of the furnace. The openings at the bottom of the inner layer provide a natural convective flow of gas through the furnace.

The product materials are then exposed to the specific pressure and specific temperature for a period of time required for producing a particular product.

The following non-limiting examples help illustrate the claimed furnace system.

Example 1

FIGS. 1-13 illustrate one embodiment of the furnace that was produced. FIG. 1 shows a furnace 100 including an outer shell 102, the outer shell 102 comprising a top flange 104, body portion 106, and bottom flange 108. In FIG. 1, the top flange 104 was covered by the hydraulic ram 110. The furnace 100 was a vertical well type with a cold wall design and was electrically powered. The bottom flange 108 had 20 bolts 112 to attach the bottom flange 108 to the body portion 106. The outer shell 102 had a length of 50 inches (130 cm). The height from an inner surface of the bottom flange 108 to an inner surface of the top flange 104 was 68¾ inches (175 cm). The total height from the bolts 112 that secure the bottom flange 108 to the body portion 106 to the bolts (not pictured in FIG. 1) that secure the top flange 104 to the body portion 106 was 82⅞ inches (210 cm). The body portion 106 of the outer shell 102 had an 18 inch (46 cm) outer diameter. The body portion 106 has no penetrations through it or "make or break" electrical connections.

Figure 2:
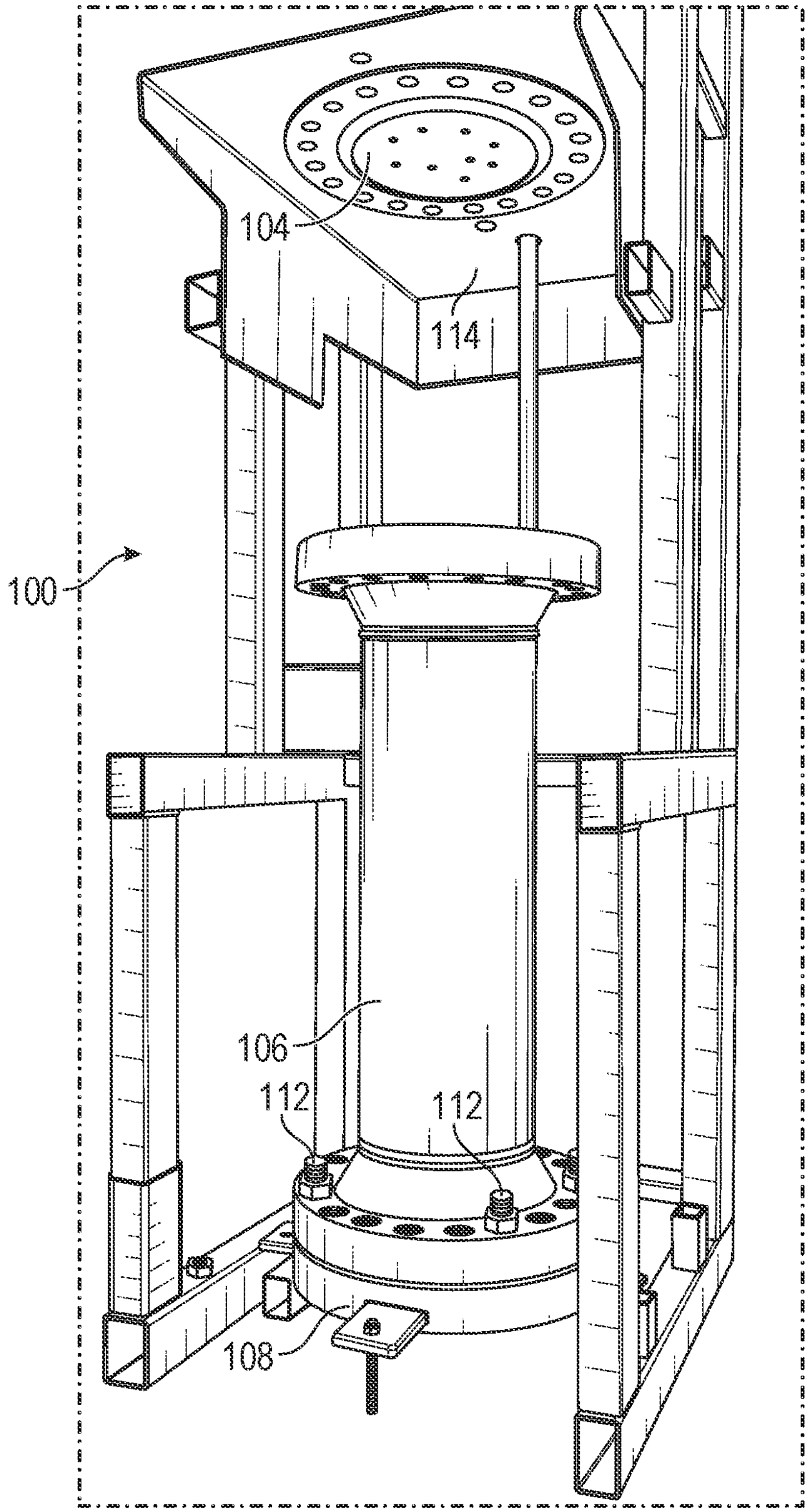
FIG. 2 illustrates a furnace in an open configuration in accordance with an embodiment of the disclosure.

FIG. 2 shows the furnace 100 in an open configuration in which the top flange 104 was separated from the body portion 106 by a hydraulic ram 110. In the open configuration, the inside of the furnace 100 was accessible from the top. The top flange 104 is visible in FIG. 2 in the housing 114 of the hydraulic ram 110.

Figure 3:
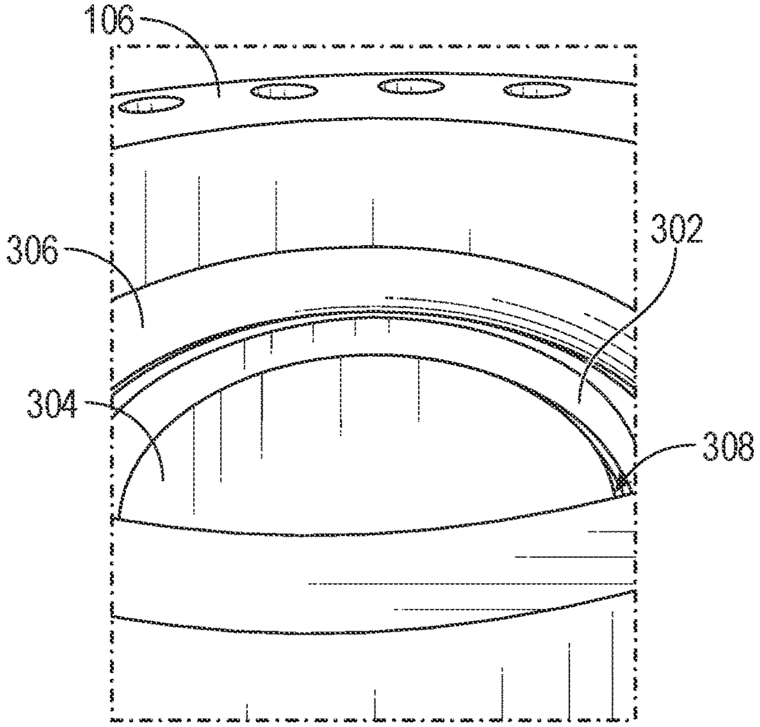
FIG. 3 illustrates the inside of a furnace in accordance with an embodiment of the disclosure.

FIG. 3 shows the inside of the furnace 100 from a top down view. The body portion 106 of outer shell 102, insulation layer 302, and innermost layer 304 were visible from this perspective. Insulation layer 302 and innermost layer 304 are kept in a certain alignment, creating an annular space 308 between the insulation layer 302 and the innermost layer 304. Woven high temperature gasket 306 contributes to heat retention when furnace 100 is in use. The outer shell 102 was 0.937 inches (23.8 mm) thick, with an approximate 16 inch (41 cm) inner diameter. The insulation layer 302 was comprised of a one-piece ceramic body. The insulation layer 302 had a 15⅞ inch (40 cm) outer diameter, a 12 inch (30 cm) inner diameter, and 60 inch (150 cm) walls. In the embodiment depicted in FIG. 3, the innermost layer 304 was an Inconel® baffle tube.

Figure 4:
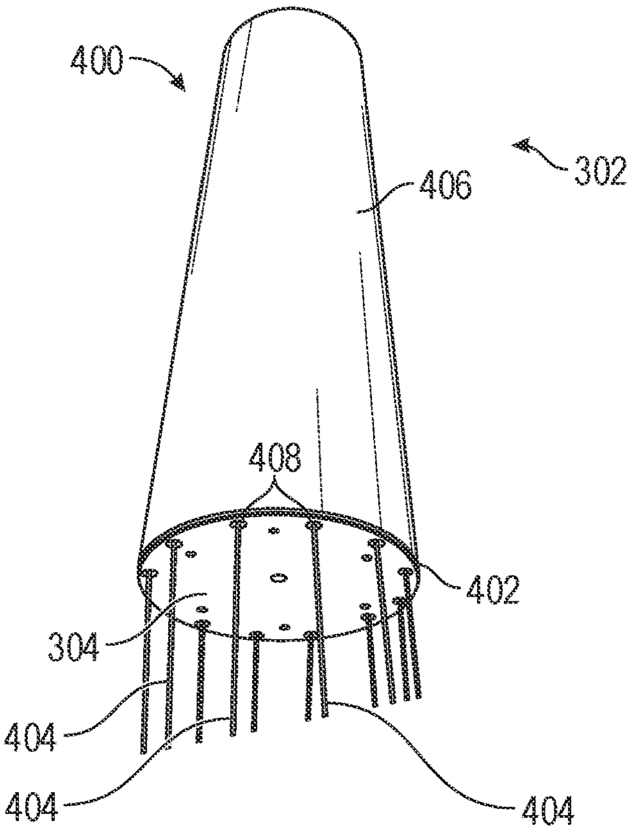
FIG. 4 illustrates a heater assembly in accordance with an embodiment of the disclosure.

FIG. 4 shows a heater assembly 400 that includes the insulation layer 302 with the innermost layer 304 attached. The bottom of innermost layer 304 is in the form of a flange 402. The insulation layer 302 had 12 electrical lead wires 404 extending through the wall 406 of the insulation layer 302, through holes (not pictured in FIG. 4) in the bottom of the insulation layer 302 and through bore holes 408 in the flange 402 of the innermost layer 304 to secure the innermost layer 304 in a preferred alignment to the insulation layer 302.

Figure 5:
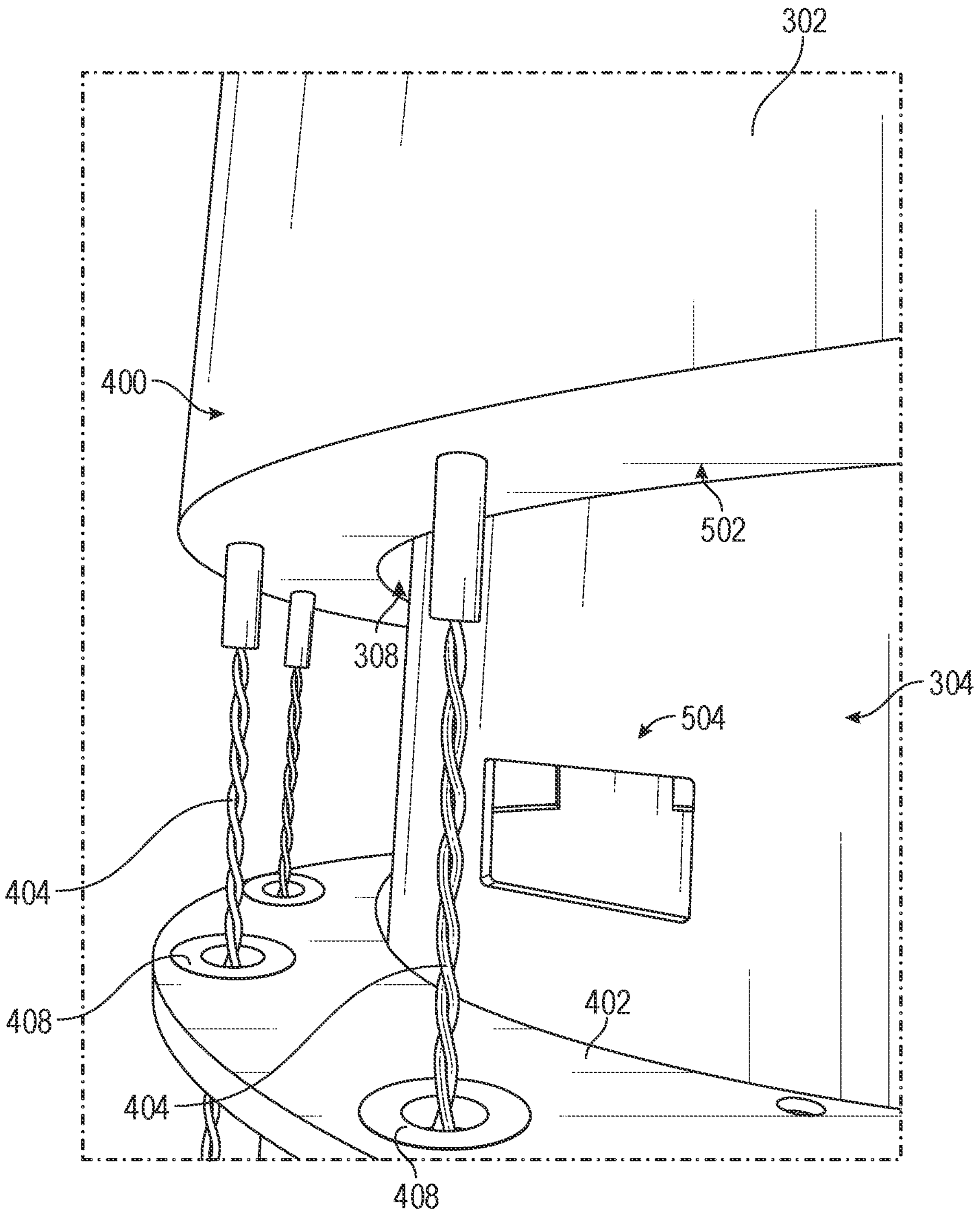
FIG. 5 illustrates electrical lead wires in the wall of a heater assembly in accordance with an embodiment of the disclosure.

FIG. 5 shows the electrical lead wires 404 of heater assembly 400 being inserted through bore holes 408 on the flange 402 of the innermost layer 304. These wires are also a mechanical means to guide the insulation layer 302 to the innermost layer 304 in a certain alignment that creates the annular space 308 between the insulation layer 302 and the innermost layer 304. An opening 504 in the innermost layer 304 is visible here.

Figure 6A:
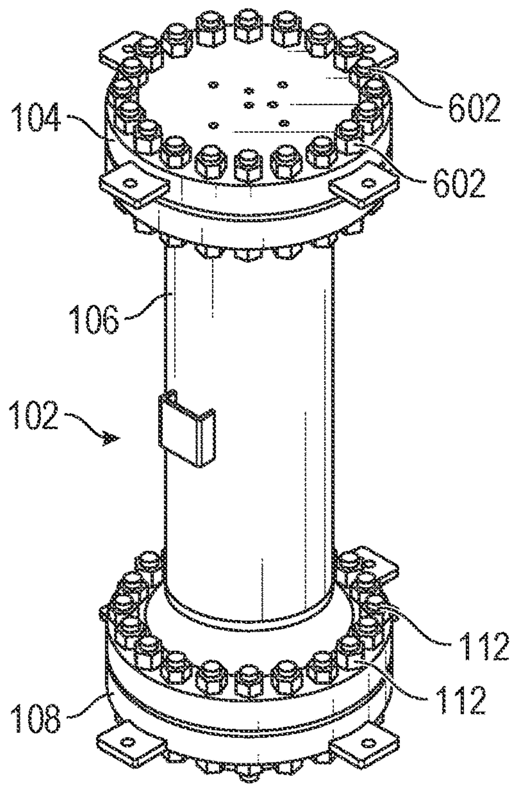
FIG. 6A illustrates a perspective view of the outer shell of a furnace in accordance with an embodiment of the disclosure.
Figure 6B:
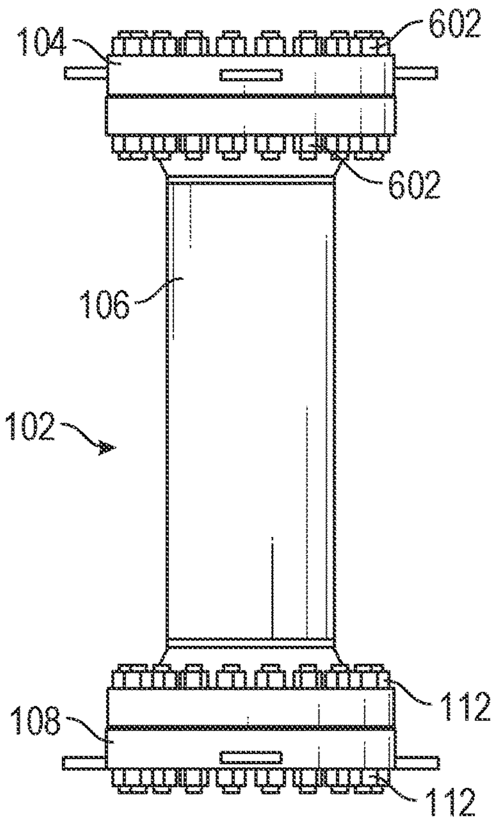
FIG. 6B illustrates a side view of the outer shell in FIG. 6A.
Figure 6C:
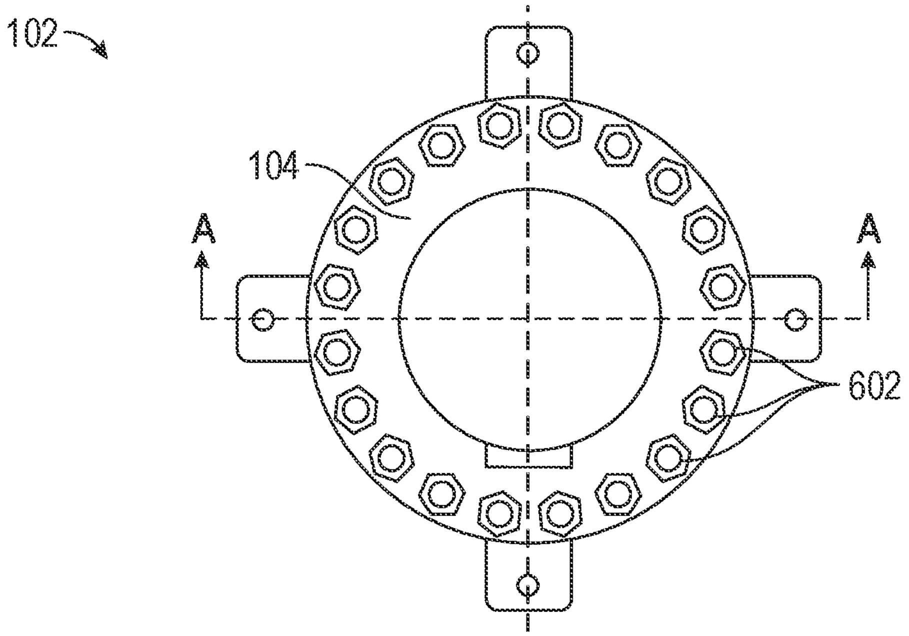
FIG. 6C illustrates a top view of the outer shell in FIGS. 6A-6B.
Figure 6D:
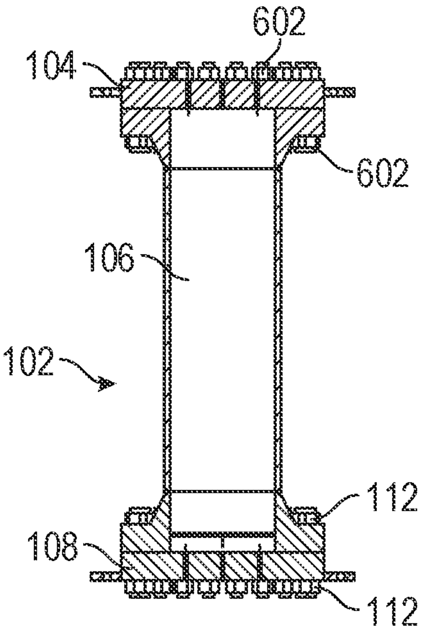
FIG. 6D illustrates a side view in cross section of the outer shell in FIGS. 6A-6C.

FIG. 6A shows a perspective view of the outer shell 102, which is formed from top flange 104, body portion 106, and bottom flange 108. The bottom flange 108 had 20 bolts 112 to attach to the body portion 106. The outer shell 102 had a length of 50 inches (130 cm). The height from an inner surface of the bottom flange 108 to an inner surface of the top flange 104 was 68¾ inches (175 cm). The total height from the bolts 112 that secure the bottom flange 108 to the body portion 106 to the bolts 602 that secure the top flange 104 to the body portion 106 was 82⅞ inches (210 cm). The body portion 106 of the outer shell 102 had an 18 inch (46 cm) outer diameter. FIG. 6B shows a side view of the outer shell 102 depicted in FIG. 6A. FIG. 6C shows a top view of the outer shell 102, consisting of a top view of the top flange 104 and 20 bolts 602. FIG. 6D shows a side-view in cross-section along the line A-A.

Figure 7:
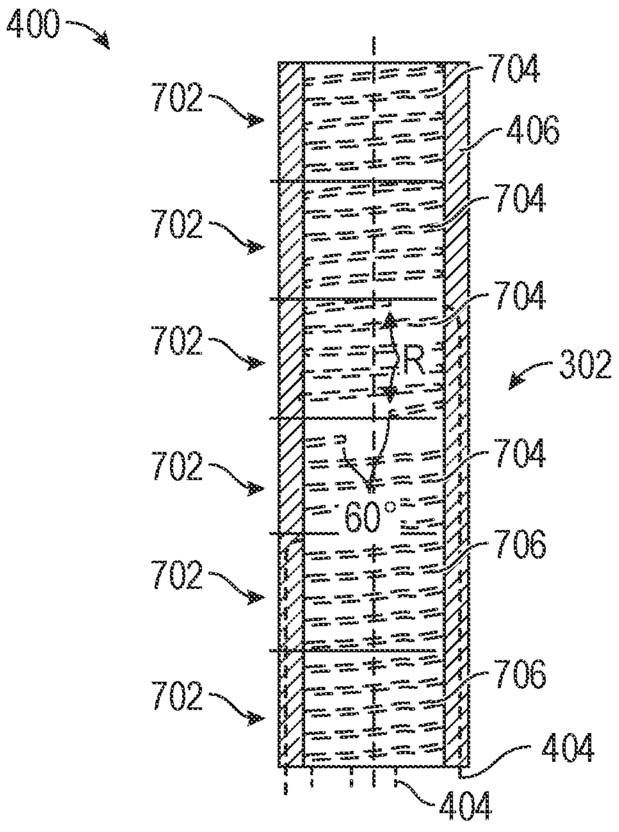
FIG. 7 illustrates a schematic for a heater assembly in accordance with an embodiment of the disclosure.

FIG. 7 shows a schematic for the heater assembly 400. The system comprised 6 heater elements 702: four with Kanthal® A1 Wire, 13 Gauge 704, and two with Kanthal® A1 Wire, 12 Gauge 706. Each heater element comprised the A1 Wire coiled around and flush with the inside surface of the insulation layer 302. Each heater element wire started offset by 60° around the inside of the insulation layer 302 relative to the beginning of the next heater element wire. The end of each heater element wire is positioned at the same radial position R as the beginning of that heater element wire. In a 6-heater system, the top four heaters were 3.0 KW/208V circular heaters and the bottom two heaters are 3.8 KW/208V circular heaters. The heater provided a max operating temperature of 1000° C. Electrical lead wires 404 are depicted below the heater assembly 400. Electrical lead wires 404 extend through the wall 406 of insulation layer 302

Figure 8:
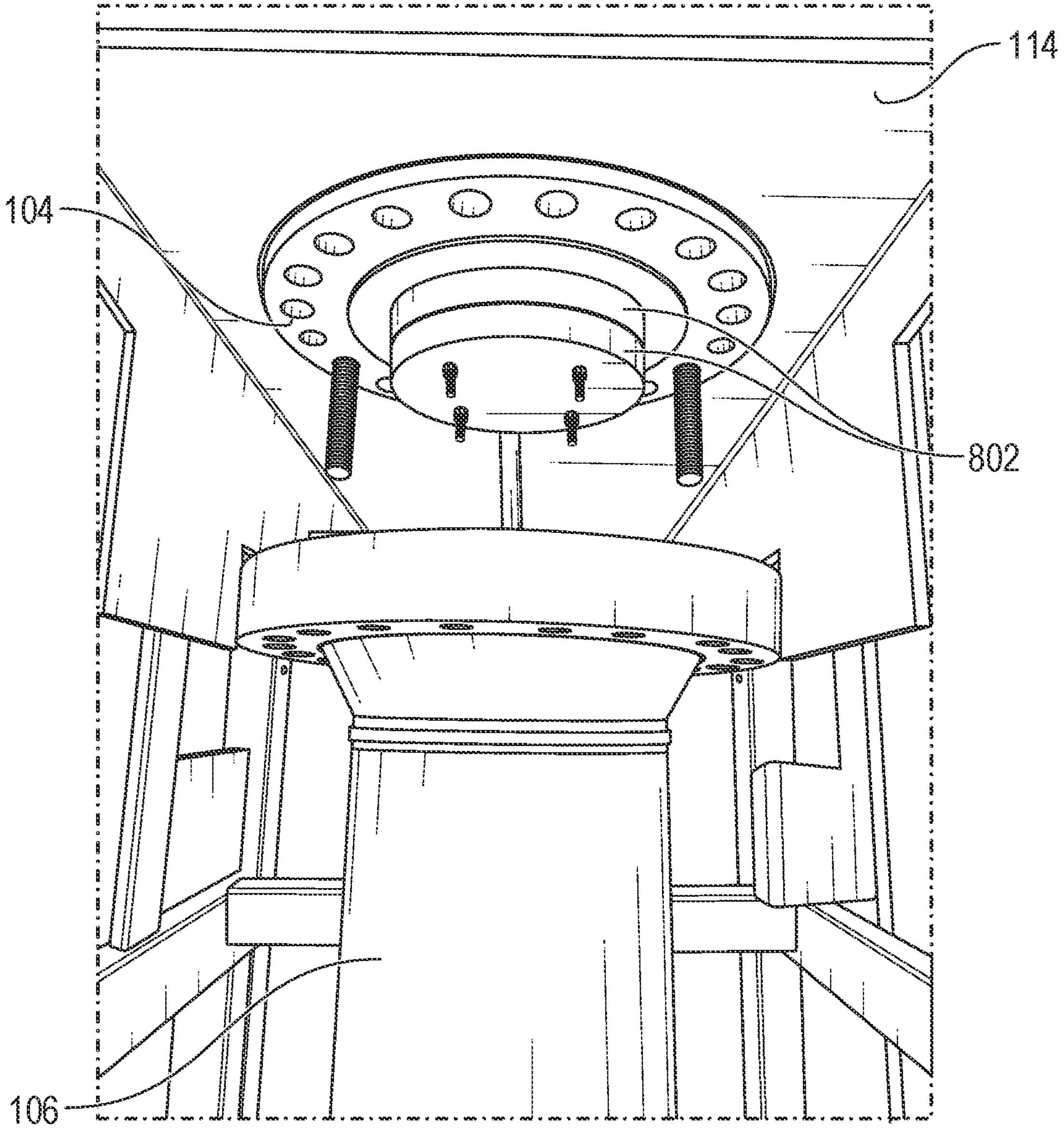
FIG. 8 illustrates the top flange of a furnace in accordance with an embodiment of the disclosure.

FIG. 8 shows the top flange 104 with two two-inch (5 cm) top insulation plates 802 attached to the top flange 104.

Figure 9:
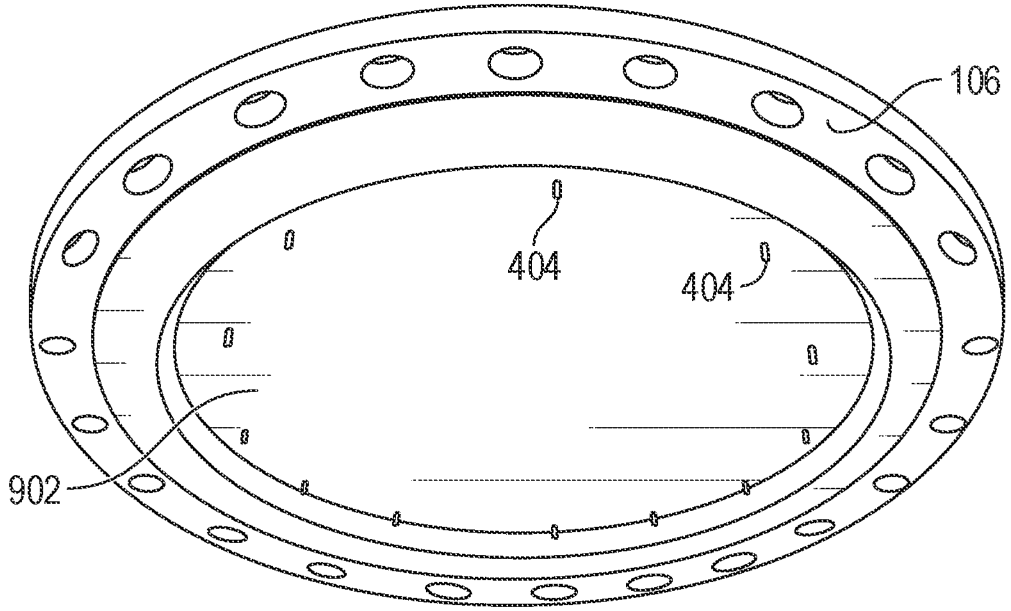
FIG. 9 illustrates the bottom of a heater assembly in accordance with an embodiment of the disclosure.

FIG. 9 shows a bottom view of body portion 106 but with one two-inch (5.1 cm) bottom insulation plate 902 attached to the heater assembly 400. Electrical lead wires 404 are depicted extending through bottom insulation plate 902.

Figure 10:
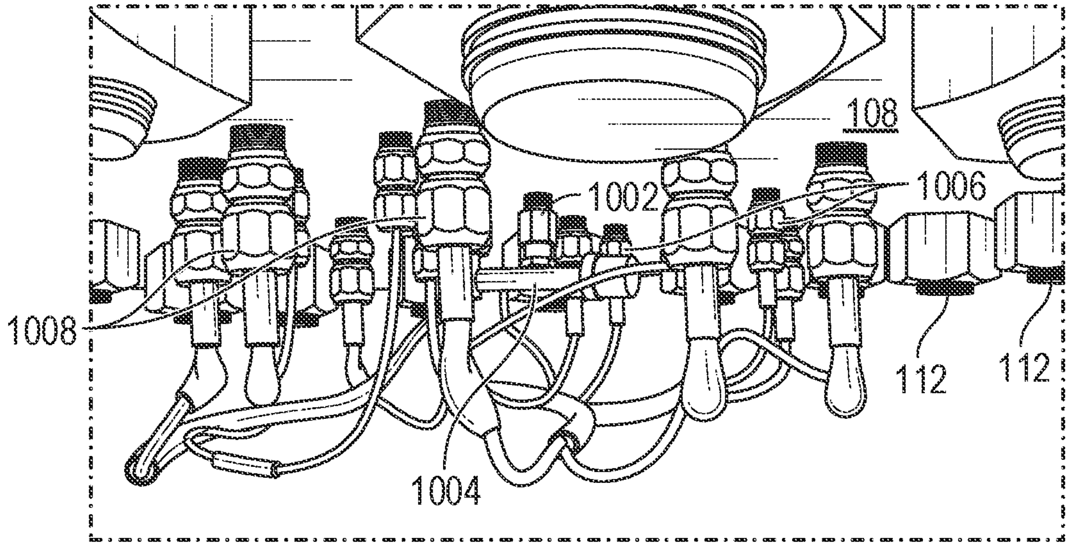
FIG. 10 illustrates the bottom of a furnace in accordance with an embodiment of the disclosure.

FIG. 10 shows a bottom view of the bottom flange 108 with the gas inlet 1002 and pressure transducer 1004, the six control thermocouples 1006 that go into the space between the heaters 702 and the innermost layer 304, and the twelve electrical feedthroughs 1008 connecting to the twelve electrical lead wires 404.

Figure 11:
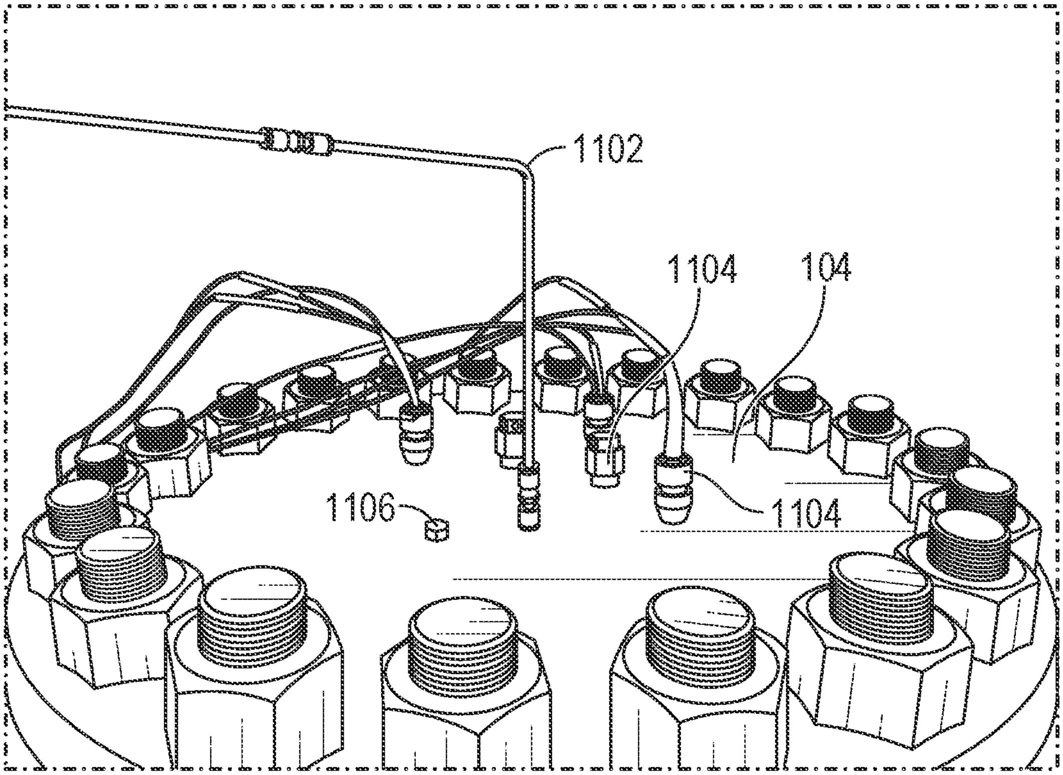
FIG. 11 illustrates the top of a furnace in accordance with an embodiment of the disclosure.

FIG. 11 shows the top of top flange 104 with the gas outlet tube 1102 going to the heat exchanger and back pressure regulator (not pictured). Sample thermocouple feedthroughs 1104 are also shown, which house four sensors each. The port 1106 in front of the gas outlet (depicted in a plugged configuration) is for an analog pressure gauge of the same accuracy scale of the pressure transducer, ±0.25% accuracy, which is about 2 psi (13.8 kPa) at operating pressure.

Figure 12:
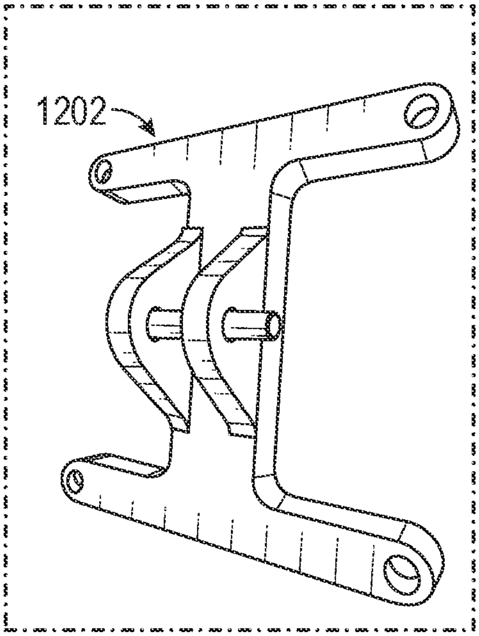
FIG. 12 illustrates an H-bracket in accordance with an embodiment of the disclosure.

FIG. 12 shows an H-bracket 1202 as described herein. In some embodiments, the H-bracket 1202 is mounted to the top flange 104 in a manner to secure the top insulation plates 802 to the ceiling of the furnace 100. The H-bracket 1202 may also serve as a universal mount for various types of magnets such as solenoids, CCT (canted cosine theta) and "Race Track" coils. Adjustable holders and hanging fixtures are releasably attachable to the H-bracket 1202 to hold materials/objects within the furnace 100 during operation of the furnace 100.

Figure 13:
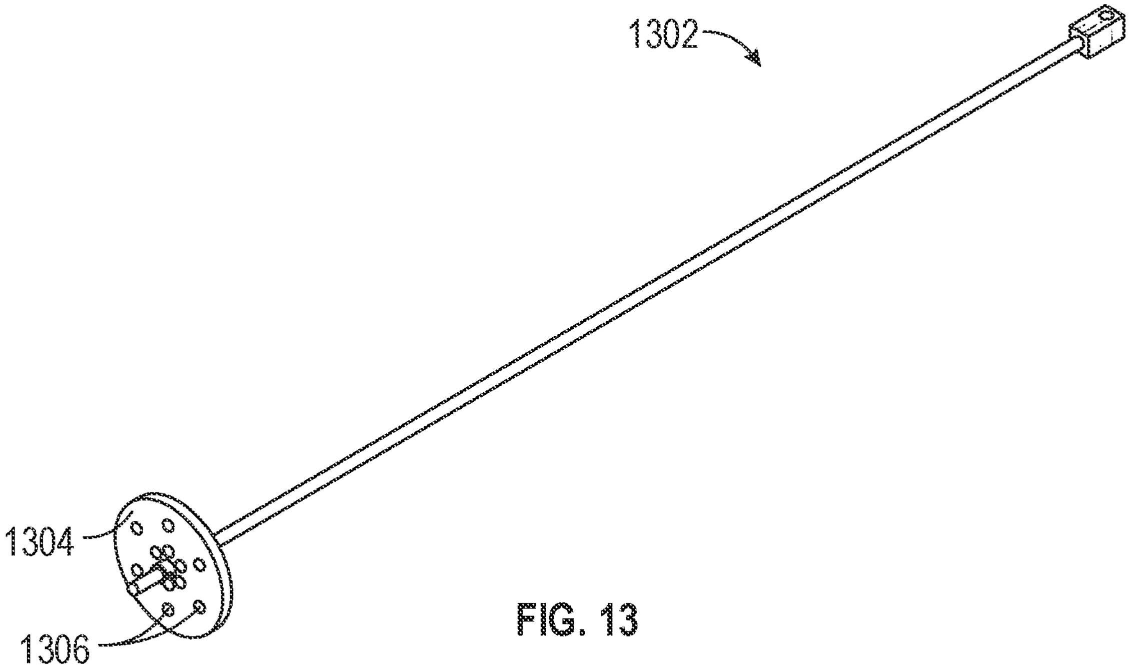
FIG. 13 illustrates a fixture for anchoring furnace material in accordance with an embodiment of the disclosure.

FIG. 13 shows one possible fixture 1302 that may be attached to the H-bracket 1202 and hold material in the working zone of the furnace 100. In this case, the fixture 1302 is a hanging fixture that has a disc-shaped platform 1304 on the end with holes 1306 in the platform. Holes 1306 may provide an anchor point, for example, for fixing material to the platform 1304.

Exemplary Embodiments

Embodiment 1. A furnace system comprising: an outer shell which comprises a top flange, an elongated body portion, and a bottom flange; a heater assembly which comprises (i) a single-piece annular shaped insulation layer, and (ii) a plurality of heaters embedded in the insulation layer, wherein the heater assembly is disposed within the elongated body portion of the outer shell; and an innermost layer disposed within the annular-shaped insulation layer.

Embodiment 2. The furnace system of embodiment 1, wherein the innermost layer is a baffle tube configured to force a natural convective flow.

Embodiment 3. The furnace system of embodiment 1 or 2, wherein each of the plurality of heaters is individually controlled.

Embodiment 4. The furnace system of any one of embodiments 1 to 3, wherein the plurality of heaters consists of six heaters.

Embodiment 5. The furnace system of any one of embodiments 1 to 4, wherein the plurality of heaters are configured to heat different zones within the furnace to different temperatures and/or at different rates.

Embodiment 6. The furnace system of any one of embodiments 1 to 5, further comprising one or more gas inlets and one or more gas outlets for feeding one or more gases or gas mixture through the furnace.

Embodiment 7. The furnace system of any one of embodiments 1 to 6, further comprising a control system to control (1) temperatures and pressure within the furnace, and (2) rate of gas flow through the furnace.

Embodiment 8. The furnace system of any one of embodiments 1 to 7, wherein the outer shell is a pressure vessel, with no penetrations in the elongated body portion.

Embodiment 9. The furnace system of any one of embodiments 1 to 8, wherein electrical feedthroughs, control thermocouples, pressure transducer and gas inlets are located in the base flange, and wherein the sample thermocouples and gas outlet are located in the top flange.

Embodiment 10. The furnace system of any one of embodiments 1 to 9, which is configured to be operated at a temperature up to at least 1000° C.

Embodiment 11. A method comprising operating the furnace system of any one of embodiments 1 to 10, to controllably heat magnetic materials.

That which is claimed is:

1. A furnace system comprising:

an outer shell which comprises a top flange, an elongated body portion, and a bottom flange;

a heater assembly which comprises (i) a single-piece annular shaped insulation layer, and (ii) a plurality of heaters embedded in the insulation layer, wherein the heater assembly is disposed within the elongated body portion of the outer shell;

an innermost layer disposed within the annular-shaped insulation layer; and a gas inlet and a gas outlet, which are configured to feed one or more gases or gas mixture through the furnace.

2. The furnace system of claim 1, wherein the outer shell is a pressure vessel, with no penetrations in the elongated body portion.

3. The furnace system of claim 2, wherein the innermost layer is a baffle tube comprising a series of openings radially spaced around a circumference of the baffle tube, the series of openings configured to force a natural convective flow.

4. The furnace system of claim 1, wherein the plurality of heaters are configured to heat different zones within the furnace to different temperatures and/or at different rates.

5. The furnace system of claim 4, wherein each of the plurality of heaters is individually controlled.

6. The furnace system of claim 1, wherein the plurality of heaters consists of six heaters.

7. The furnace system of claim 6, wherein each of the plurality of heaters is individually controlled.

8. The furnace system of claim 1, further comprising two or more gas inlets and two or more gas outlets, which are configured to feed one or more gases or gas mixture through the furnace.

9. The furnace system of claim 1, further comprising a control system to control (1) temperatures and pressure within the furnace, and (2) rate of gas flow through the furnace.

10. The furnace system of claim 1, wherein electrical feedthroughs, control thermocouples, pressure transducer and a gas inlet are located in the base flange, and wherein sample thermocouples and a gas outlet are located in the top flange.

11. The furnace system of claim 1, which is configured to be operated at a temperature up to at least 1000° C.

12. A method of heat treating magnet materials, the method comprising:

deploying a magnet material within a furnace of the furnace system of claim 1; and heat treating the magnet material within the furnace.

13. The method of claim 12, wherein the magnet material comprises or consists of Bi-2212.

14. The method of claim 12, wherein the magnet material is in the form of a wire.

15. A furnace system comprising:

an outer shell which comprises a top flange, an elongated body portion, and a bottom flange, wherein the outer shell is a pressure vessel, with no penetrations in the elongated body portion;

a heater assembly which comprises (i) a single-piece annular shaped insulation layer, and (ii) a plurality of heaters embedded in the insulation layer, wherein the heater assembly is disposed within the elongated body portion of the outer shell; and an innermost layer disposed within the annular-shaped insulation layer, wherein the innermost layer is a baffle tube comprising a series of openings radially spaced around a circumference of the baffle tube, the series of openings configured to force a natural convective flow, wherein each of the plurality of heaters is individually controllable and the plurality of heaters are configured to heat different zones within the furnace to different temperatures and/or at different rates, and wherein electrical feedthroughs, one or more control thermocouples, one or more pressure transducers, and one or more gas inlets are located in the base flange, and wherein one or more sample thermocouples and a gas outlet are located in the top flange.

16. The furnace system of claim 15, wherein the plurality of heaters consists of six heaters.

17. The furnace system of claim 15, further comprising a control system to control (1) temperatures and pressure within the furnace, and (2) rate of gas flow through the furnace.

* * * * *